United States Patent
Nakatani

(10) Patent No.: US 7,306,752 B2
(45) Date of Patent: Dec. 11, 2007

(54) METHOD FOR PREPARING RESIN PARTICLES, RESIN PARTICLES AND APPARATUS FOR PREPARING RESIN PARTICLES

(75) Inventor: Yasuhiro Nakatani, Mishima-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 493 days.

(21) Appl. No.: 10/481,604

(22) PCT Filed: Jun. 21, 2002

(86) PCT No.: PCT/JP02/06208

§ 371 (c)(1),
(2), (4) Date: May 7, 2004

(87) PCT Pub. No.: WO03/000741

PCT Pub. Date: Jan. 3, 2003

(65) Prior Publication Data

US 2004/0232071 A1 Nov. 25, 2004

(30) Foreign Application Priority Data

Jun. 22, 2001 (JP) ............................. 2001-189989
Jun. 22, 2001 (JP) ............................. 2001-189990

(51) Int. Cl.
*B29B 9/10* (2006.01)

(52) U.S. Cl. ............................. 264/9; 264/40.1; 425/6; 425/140

(58) Field of Classification Search ...................... None
See application file for complete search history.

(56) References Cited

U.S. PATENT DOCUMENTS

| | | | | |
|---|---|---|---|---|
| 4,035,116 A | * | 7/1977 | O'Brien et al. | 148/540 |
| 4,419,303 A | * | 12/1983 | Anderson | 264/9 |
| 4,444,961 A | | 4/1984 | Timm | |
| 4,623,706 A | | 11/1986 | Timm et al. | |
| 5,015,423 A | | 5/1991 | Eguchi et al. | |
| 5,061,741 A | | 10/1991 | Miyata et al. | |
| 5,183,493 A | | 2/1993 | Brandau et al. | |
| 5,278,626 A | * | 1/1994 | Poole et al. | 356/36 |
| 5,891,212 A | * | 4/1999 | Tang et al. | 75/335 |
| 6,003,678 A | * | 12/1999 | Van den Engh | 209/158 |

(Continued)

FOREIGN PATENT DOCUMENTS

GB        1410832        10/1975

(Continued)

*Primary Examiner*—Mary Lynn Theisen
(74) *Attorney, Agent, or Firm*—Sughrue Mion, PLLC

(57) ABSTRACT

The present provides a method for preparing resin fine particles of a homogeneous particle size used in the fields of chemistry, medicine, electronic material or the like, resin fine particles, and a production apparatus for resin fine particles.

The present invention provides a method for preparing a resin fine particle, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising recognizing a state of said liquid being split into a liquid droplet, and a condition of said discharging and/or said mechanical vibration of the liquid being determined by feedback from a result of the recognition.

5 Claims, 3 Drawing Sheets

U.S. PATENT DOCUMENTS

| | | | |
|---|---|---|---|
| 6,471,894 B1 * | 10/2002 | Kravchenko et al. | 264/9 |
| 6,858,167 B2 * | 2/2005 | Matthaei et al. | 264/9 |
| 2002/0054912 A1 * | 5/2002 | Kim et al. | 424/489 |

FOREIGN PATENT DOCUMENTS

| | | |
|---|---|---|
| GB | 1 436 167 | 5/1976 |
| JP | 31-8296 B1 | 9/1956 |
| JP | 49055782 | 5/1976 |
| JP | 57-102905 A | 6/1982 |
| JP | 61-83202 A | 4/1986 |
| JP | 63-123431 A | 5/1988 |
| JP | 2-199137 A | 8/1990 |
| JP | 3-249931 A | 11/1991 |
| JP | 4-227043 A | 8/1992 |
| JP | 5-194610 A | 8/1993 |
| JP | 2001-162147 A | 6/2001 |
| WO | WO 99/40802 * | 8/1999 |

* cited by examiner

US 7,306,752 B2

METHOD FOR PREPARING RESIN PARTICLES, RESIN PARTICLES AND APPARATUS FOR PREPARING RESIN PARTICLES

TECHNICAL FIELD

The present invention relates to a method for preparing resin fine particles of a homogeneous particle size used in the fields of chemistry, medicine, electronic material or the like, resin fine particles and a production apparatus for resin fine particles.

BACKGROUND ART

Conventionally, as a method for producing resin fine particles, a suspension polymerization method is known. This method is a method for placing a water based medium with a dispersion stabilizer dissolved in a reaction vessel with an agitator, introducing a polymerizable monomer with a polymerization initiator dissolved while agitating, and heating, thereby obtaining resin fine particles. However, the particle size distribution of the resin fine particles obtained by the method is wide, so that a sorting operation such as classification is necessary for the application requiring the homogeneity of the particle size of a column filling material, a spacer, a toner, a material for a foamed product, or the like, and thus it is extremely complicated.

In contrast, Japanese Kokai Publication Sho-57-102905 discloses a method for crushing a polymerizable monomer flow having a laminar flow characteristic to small liquid droplets by applying mechanical vibration, moving the same to a polymerization vessel in a continuous phase, and polymerizing by heating. However, according to the apparatus disclosed in this method, since a plurality of polymerizable monomer openings are provided, it is actually difficult to discharge by the same flow amount from each of the openings, so that the flow amount irregularity is occurred. Thus, the liquid droplets split at the same mechanical frequency has irregularity in capacity, that is, in size. Therefore, according to the apparatus, since the split state cannot be grasped sufficiently, in the case where split failure is occurred, it is difficult to avoid the split failure so that the particle size homogeneity of the final resin fine particles is deteriorated. Moreover, since the apparatus has no mechanism for checking the liquid droplet production state or the liquid droplet particle size, even in the case where the particle size homogeneity is deteriorated by the production condition fluctuation or the like, the production is continued as it is, and thus there is a problem that the homogeneity of the resin fine particles to be obtained is poor.

SUMMARY OF THE INVENTION

An object of the present invention is to provide a method for preparing resin fine particles of a homogeneous particle size used in the fields of chemistry, medicine, electronic material or the like, resin fine particles, and a production apparatus for resin fine particles.

The present invention provides a method for preparing a resin fine particle, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising recognizing a state of said liquid being split into a liquid droplet, and a condition of said discharging and/or said mechanical vibration of the liquid being determined by feedback from a result of the recognition.

Moreover, the present invention provides a method for preparing a resin fine particle, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising measuring size of said formed liquid droplet, and a condition of said discharging and/or said mechanical vibration of the liquid being determined by feedback from a result of the measurement.

According to one aspect of the present invention, provided is a resin fine particle produced by the method for preparing a resin fine particle according to the present invention, which has an average particle size of 10 to 3,000 μm, and 80% or more of which falls within a range of ±10% of the average particle size.

According to another aspect of the present invention, provided is a production apparatus for a resin fine particle, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a photography unit for photographing a formed liquid droplet.

According to still another aspect of the present invention, provided is a production apparatus for a resin fine particle, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a measuring means for measuring size of a formed liquid droplet. Preferably, the production apparatus for resin fine particles comprises a means for adjusting a discharging condition and/or a mechanical vibration condition of a liquid comprising a polymerizable monomer based on a measurement result of size of a liquid droplet.

BRIEF DESCRIPTION OF THE DRAWING(S)

Figure 1:
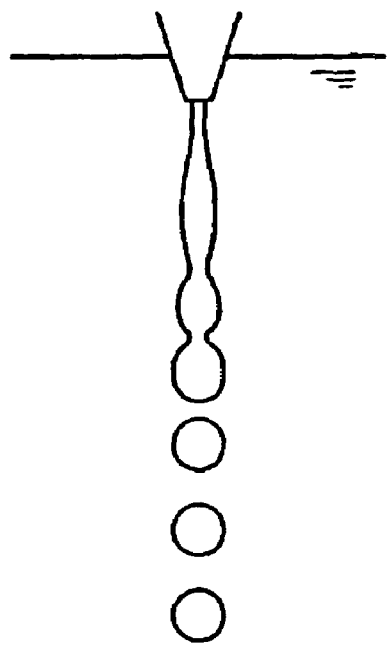
FIG. 1 is a schematic diagram showing a case where liquid droplets are normally formed from a liquid column of a polymerizable monomer.

In the figures, 1 represents a container for a liquid polymerizable monomer; 2 represents a jetting opening; 3 represents a dispersion container; 4 represents a transducer; 5 represents a photography unit; 6 represents an illumination unit; 7 represents a CRT display; A represents an amplifier; C1 represents a pump controller; C2 represents an image controller; D represents liquid dispersion medium; FG represents a function generator (electrical signal generator); M represents liquid polymerizable monomer; P represents a pump; and S represents a measuring unit.

DETAILED DISCLOSURE OF THE INVENTION

Hereinafter, the present invention will be described in detail.

A method for preparing a resin fine particle according to the present invention comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet.

The continuous phase is not limited to the gas and the liquid. Examples of the gas include air, inert gas such as nitrogen and argon, and the like. Examples of the liquid, in the case of an oil in water phase system having the continuous phase as a water system and the polymerizable monomer as an oil system, include water, a solvent mixture of water and a water soluble organic solvent such as alcohol, and the like. Moreover, examples of the liquid, in the case of a water in oil phase system having the continuous phase as an oil system and the polymerizable monomer as a water system, include aliphatic hydrocarbon such as n-hexane and n-octane; halide hydrocarbon system such as carbon tetrachloride; and aromatic hydrocarbon such as toluene and xylene, and the like.

To the continuous phase, it is preferable to add a dispersion stabilizer so as to prevent split and integration of the formed liquid droplets. The dispersion stabilizer is not particularly limited, and examples thereof, in the case of an oil in water phase system, include polyvinyl alcohol; cellulose such as carboxy methyl cellulose and hydroxy methyl cellulose; water soluble polymer such as starch and gelatin; hardly water soluble inorganic salt such as tricalcium phosphate, and the like. In the case of a water in oil phase system, examples of the dispersion stabilizer include sodium alkyl benzene sulfonate and the like.

To the continuous phase, furthermore, a surfactant, a specific gravity adjusting agent or the like may be added for adjusting the surface tension.

As the dispersion phase, a liquid comprising polymerizable monomer is used. Examples of the polymerizable monomer, in the case of an oil in water phase system, include a monovinyl aromatic compound such as styrene, vinyl naphthalene and alkyl substituted styrene; halo substituted styrene such as bromo styrene and chloro styrene; polyvinyl aromatic compound such as divinyl benzene, divinyl toluene, divinyl xylene, divinyl naphthalene, trivinyl benzene, divinyl diphenyl ether and divinyl diphenyl sulfone; halo olefin or vinyl halide of vinyl chloride or the like; ester of α-β-ethylenically unsaturated carboxylic acid such as ester of acrylic acid or methacrylic acid; methyl methacrylate, ethyl acrylate, vinyl acetate and the like. In particular, in the case of use for the electronic material field, divinyl benzene as crosslinkable polymerizable monomer capable of obtaining the heat resistance and one produced by mixing divinyl benzene and polyfunctional acrylate are preferable. These polymerizable monomers may be used alone or in a combination of two or more kinds.

Moreover, examples of the polymerizable monomer, in the case of a water in oil phase system, include ethylenically unsaturated carboxy amide such as acrylic amide, methacrylic amide, fumaric amide and ethacrylic amide; amino alkyl ester of unsaturated carboxylic acid; acid unhydride; water soluble polymerizable monomer such as ethylenically unsaturated carboxylic acid such as acrylic acid and methacrylic acid, and the like.

To the dispersion phase, a polymerization initiator may be added. As the polymerization initiator, those conventionally known can be used. Examples of the polymerization initiator, in the case of an oil in water phase system, include benzoyl peroxide, lauroyl peroxide, methyl ethyl ketone peroxide, potassium persulfate, azo bisisobutylonitrile, azo bisvaleronitrile and the like, and in the case of a water in oil phase system, include water soluble polymerization initiator such as persulfate, hydrogen-peroxide and hydroperoxide. Moreover, in the case of the polymerization by a light beam, a photo polymerization initiator is used, and other polymerization auxiliary agents such as a chain transfer agent may be added.

Moreover, to the dispersion phase, a sensitizer, a viscosity adjusting agent, a solvent, a surfactant for adjusting the surface tension, or the like may be added in a range not to influence the polymerization.

According to the method for preparing resin fine particles of the present invention, liquid droplets are formed by discharging a liquid comprising a polymerizable monomer as a dispersion phase into a continuous phase; splitting the liquid comprising the polymerizable monomer by applying mechanical vibration. For example, when liquid droplets of the polymerizable monomer are discharged into the continuous phase in a condition so as to form a laminar flow from an opening such as a nozzle or an orifice, a liquid column of the polymerizable monomer is formed in the vicinity of the opening. When a surface wave is applied to the liquid column by applying the mechanical vibration to the liquid column, the liquid column is deformed so as to generate a constriction, and split from the part to form liquid droplets. The state of the liquid droplet formation is shown in FIG. 1. Since the constriction part is generated according to the vibration frequency, the capacity of one piece of the liquid droplet can be calculated from the value obtained by dividing the flow amount per unit time by the frequency.

According to the method for preparing resin fine particles of the present invention, a state of the liquid comprising the polymerizable monomer split into a liquid droplet, that is, the moment of the liquid droplet formation from the liquid column of the polymerizable monomer, is recognized, and the result is fed back to a condition of the discharging and/or the mechanical vibration of the liquid comprising the polymerizable monomer.

The means for recognizing the state of the liquid droplets produced by splitting the liquid is not particularly limited. For example, a camera capable of photographing by a high shutter speed sufficient for catching the high speed liquid droplet formation state by a stationary state, a method of combining such a camera and a stroboscopic illumination, or the like is preferable. Moreover, in order to enlarge the minute liquid droplets to a size visibly recognizable, it is preferable to mount an enlarging photography unit to the camera, and it is preferable that the image caught by the camera is indicated on a display or the like so as to be recognized easily.

Figure 2:
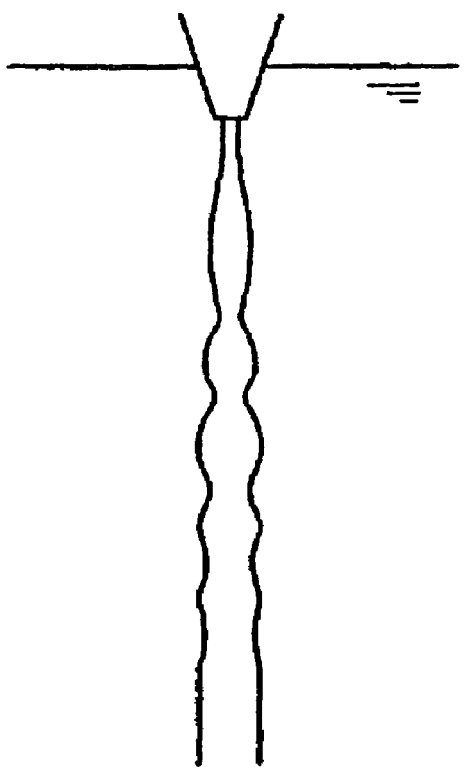
FIG. 2 is a schematic diagram showing a case where no liquid droplet is formed from a liquid column of a polymerizable monomer due to poor constriction.

The feedback refers to the operation of confirming whether or not the liquid droplets are produced normally as shown in FIG. 1 and adjusting the production condition according to the situation in the case where abnormality is occurred, or stopping the production depending on the case. As an example of the abnormality, one shown in FIG. 2 can be presented. As an example of the feedback in this case, adjustment is made such that constriction can be generated by enlarging the amplitude of the mechanical vibration to be applied for splitting the liquid droplets. By executing the feedback, resin fine particles having a homogeneous particle size can be produced.

According to the method for preparing resin fine particles of the present invention, resin fine particles can be obtained by polymerizing in a state without splitting or integrating the formed liquid droplets of the polymerizable monomer. Examples of the method for having the liquid droplets in a state without integration include a method of adding a dispersion stabilizer to the continuous phase, and the like. Examples of the method for having the liquid droplets in a state without splitting include a method of moderately agitating the continuous phase so as not to apply excessive mechanical shearing force to the liquid droplets, and the like. By heating or directing active light in the state, the polymerizable monomer is polymerized.

Moreover, resin fine particles of a homogeneous particle size can be produced also by measuring size of the formed liquid droplets and feeding back the result to a condition of a discharging and/or a mechanical vibration of the liquid comprising a polymerizable monomer.

According to one aspect of the present invention, provided is a method for preparing resin fine particles, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising measuring size of said formed liquid droplet, and a condition of said discharging and/or said mechanical vibration of the liquid being determined by feedback from a result of the measurement.

The method for measuring size of the liquid droplets is not particularly limited, and examples thereof include a method of taking in the image of the liquid droplets formed in the dispersion phase in a computer for measurement, and the like. The liquid droplets to be measured at the time are not particularly limited as long as they are in a liquid droplet state. Specifically, the image photographed by the camera can be taken in a computer to measure size of the formed liquid droplets by image analysis software. A calculation process is executed for the obtained measurement value for calculating the values of the average value, the standard deviation or the like. According to the result, a feedback operation is executed for adjusting size of the liquid droplets. The feedback can be controlled for example by sending a control signal from the computer or via a sequencer to the unit for applying the mechanical vibration or the unit for adjusting the discharge of the polymerizable monomer, or the like. For example, in the case where the particle size is too large, it is adjusted by raising the frequency of the mechanical vibration or lowering the discharge amount of the polymerizable monomer. In the case where the particle size is too small, it is adjusted by executing vice versa.

According to the method for preparing resin fine particles of the present invention, resin fine particles having a very homogeneous particle size can be obtained. According to one aspect of the present invention, provided is a resin fine particle produced by the method for preparing a resin fine particle according to the present invention, which has an average particle size of 10 to 3,000 µm, and 80% or more of which falls within a range of ±10% of the average particle size.

Herein, the preferable lower limit of the particle size of the resin fine particles of the present invention is set at 10 µm, and the upper limit is set at 3,000 µm because the resin fine particles having such a particle size can hardly be produced by the suspension polymerization, so that the method for preparing resin fine particles of the present invention can be particularly effective in this range. When the resin fine particles fallen within the range of ±10% of the average particle size are less than 80%, the resin fine particles has an inhomogeneous particle size so that a classification step may be needed.

It is preferable that a production apparatus for carrying out the method for preparing resin fine particles according to the present invention comprises at least a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a photography unit for photographing a formed liquid droplet.

According to one aspect of the present invention, provided is such a production apparatus for a resin fine particle, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a photography unit for photographing a formed liquid droplet.

Although the dispersion container is not particularly limited, in consideration of photographing the liquid droplet formation state by a CCD camera or the like, and reaction after forming the liquid droplets, a transparent one durable to the heat of about 100° C. is preferable. Examples of the dispersion container include a glass round or cylindrical separable flask container and the like.

The jetting opening is opened in the dispersion container and discharges a liquid comprising polymerizable monomer into liquid dispersion medium. As the shape of the opening part of the jetting opening, it is preferably circular, and as the channel shape for the opening, it is preferably cylindrical or truncated conical. As the material of the jetting opening, one not to be denaturalized by the component of the dispersion phase and the continuous phase, or chemically influenced. For example, stainless steel, Teflon (Trade Mark) or the like can be presented.

Although the jetting opening is not particularly limited, it is provided preferably by one. If a plurality of the jetting openings are provided side by side, irregularity is occurred in the jetting amounts of the polymerizable monomer from each jetting opening, so that the size of the liquid droplets to be formed becomes inhomogeneous by shaking, and furthermore, photographing of a clear image may be difficult due to superimposition of the liquid droplets.

The method for discharging the polymerizable monomer from the jetting opening is not particularly limited, and examples thereof include a method of sending a liquid by a pump, and the like. As the pump, one having little pulsation is preferable, and a gear pump having the flow amount easily controllable by the rotational frequency can be used preferably. In the case where a plunger pump is used as the pump, a rectifying unit needs to be used too. Moreover, it is also possible to send in compressed air to the monomer container connected with the jetting opening with a pipe for pushing out the monomer from the container, and sending out the same by a constant amount using a flow amount adjusting valve.

The means for applying the mechanical vibration is not particularly limited, and examples thereof include: a method of mechanically vibration by connecting a transducer to a member for supporting the discharging opening; a method of conveying to the monomer or the dispersion medium the reciprocating motion generated by a piston connected with an oscillator for generating an electrical signal having a regular frequency, and the like. In particular, a method of directly vibrating the member for supporting the jetting opening is preferable. Examples of the method for generating the mechanical vibration include a method of generating the vibration using a function generator (electrical signal generator), amplifying the vibration by an amplifier, and supplying the vibration to the transducer, and the like. As the transducer, one capable of adjusting the frequency and the amplitude by a signal from the outside is preferable.

Although the photography unit is not particularly limited, a CCD camera comprising a high speed shutter or a stroboscopic illumination sufficiently for catching the high speed liquid droplet formation in a stationary state, and a display capable of enlarging and displaying the minute liquid droplets in a visibly recognizable size, and the like can be used preferably.

According to one aspect of the present invention, provided is a production apparatus for a resin fine particle, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a measuring means for measuring size of a formed liquid droplet.

Although the measuring means for size of the liquid droplets is not particularly limited, for example, it is preferable to take in the image obtained by photographing the state of the liquid droplet formation by the photography unit into a computer, and measure size of the liquid droplets by an image processing unit.

Preferably, the production apparatus for the resin fine particle of the present invention further comprises a means for adjusting a discharging condition and/or a mechanical vibration condition of a liquid comprising a polymerizable monomer based on a measurement result of size of a liquid droplet. Since size of the liquid droplets formed by shaking the monomer jetted into the liquid dispersion medium is directly proportional to the jetting amount of the polymerizable monomer and it is inversely proportional to the frequency of shaking the polymerizable monomer, in the case where size of the liquid droplets is too large, an operation of reducing the discharge amount of the polymerizable monomer or increasing the frequency, and in the case the where size of the liquid droplets is too small, an operation of increasing the discharge amount of the polymerizable monomer or reducing the frequency is executed manually or automatically so as to homogenize size of the liquid droplets.

BEST MODE FOR CARRYING OUT THE INVENTION

Hereinafter, the present invention will be described in more detail with reference to examples, however, the present invention is not limited to these examples.

EXAMPLE 1

Figure 3:
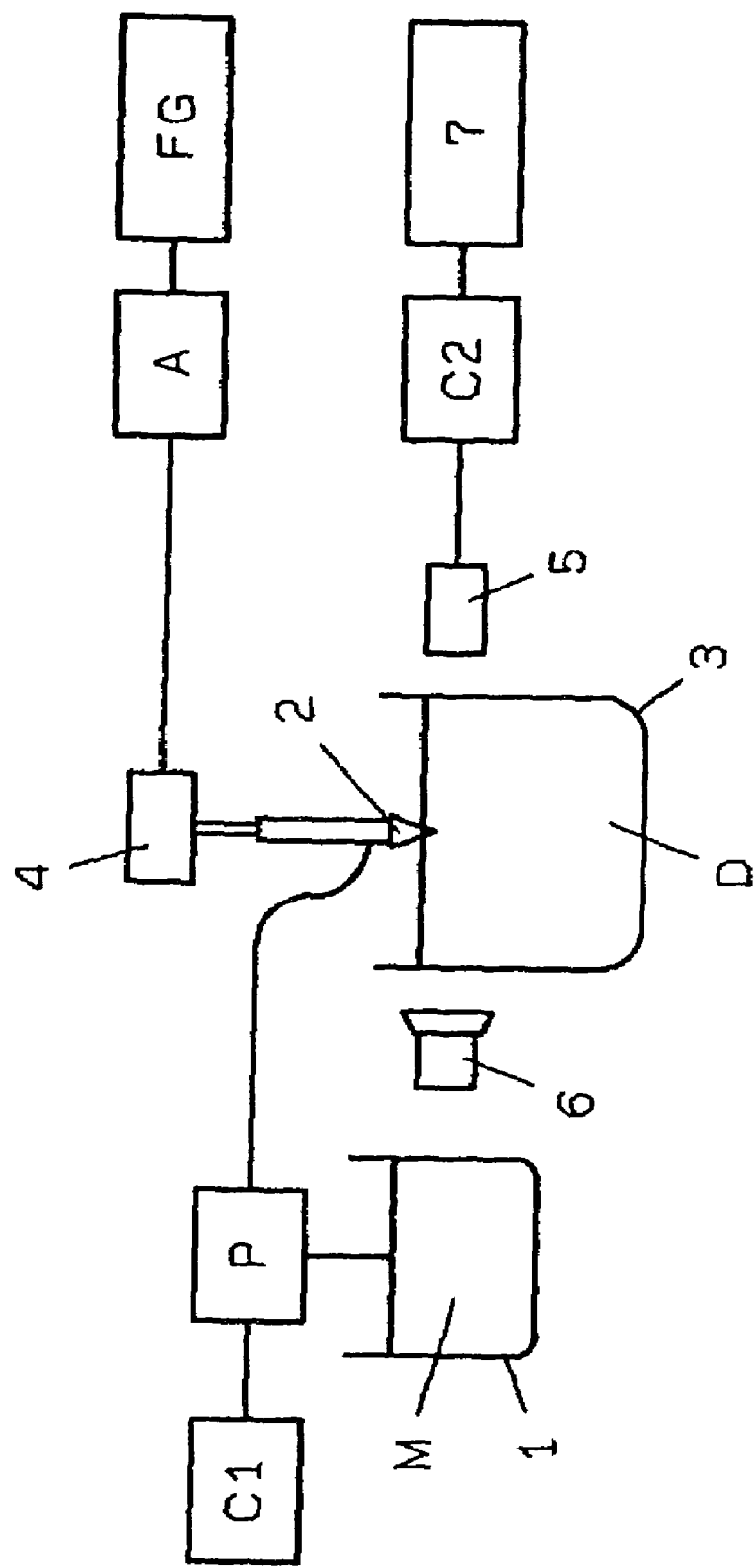
FIG. 3 is a conceptual diagram showing a production apparatus for resin fine particles used in Example 1.

First, a production apparatus for resin fine particles as shown in FIG. 3 was produced.

In the apparatus shown in FIG. 3, 1 represents a container for liquid polymerizable monomer M, with jetting opening 2 comprising a nozzle having a 0.3 mm inner diameter connected with container 1 via pump P opened in liquid dispersion medium D stored in transparent dispersion container 3.

Monomer M jetted from jetting opening 2 to liquid dispersion medium D was shaken by transducer 4 connected with a member for supporting jetting opening 2 so as to produce liquid droplets. Photography unit 5 having $\frac{1}{10,000}$ seconds high speed shutter and an enlarging lens, which is set for photographing the liquid droplet splitting state intermittently for every 5 seconds was provided on the right side of dispersion container 3, and illumination unit 6 connected with liquid source I for providing a light amount from the back side of liquid dispersion medium D was provided on the left side.

An image photographed by photography unit 5 was enlarged and displayed on 14 inch CRT display 7 via image controller C2, so that adjustment can be made for homogenizing size of the liquid droplets by a manual operation based on the visual observation result of the state of size of the produced liquid droplets. That is, in the case where size of the liquid droplets was too large, size of the liquid droplets was reduced by operating pump controller C1 to reduce the jetting amount of liquid polymerizable monomer M or by operating function generator (electrical signal generator) FG connected with amplifier A to increase the frequency of shaking liquid polymerizable monomer M. In the case where size of the liquid droplets is too small, in contrast, adjustment was made for homogenizing size of the liquid droplets by a manual operation for enlarging size of the liquid droplets by increasing the jetting amount or reducing the frequency.

Next, resin fine particles were produced using the apparatus.

Liquid polymerizable monomer M was produced by mixing 50 parts by weight of divinyl benzene and 50 parts by weight of trimethylol propane trimethacrylate. With 2 parts by weight of benzoyl peroxide added thereto, as a polymerization initiator, it was injected into container 1.

Monomer M was jetted into liquid dispersion medium D with 3% of polyvinyl alcohol added to water, stored in the glass dispersion container 3 from the jetting opening 2 having a 0.3 mm inner diameter by a 4.96 mL/minute rate. Transducer 4 shook liquid dispersion medium D with monomer M jetted by a 200 Hz frequency for producing liquid droplets.

Based on the result of the visual observation of the state of size of the produced liquid droplets with the image photographed by photography unit 5 and enlarged and displayed on CRT display 7, adjustment was made for homogenizing size of the liquid droplets by the manual operation.

By heating and agitating with an agitator and a cooling pipe installed in dispersion container 3 after jetting a predetermined amount of monomer M, Monomer M was polymerized so as to obtain resin fine particles. The average particle size of the obtained resin fine particles was 602 μm, with 92% of the resin fine particles included in a range of ±10% of the average particle size.

EXAMPLE 2

Figure 4:
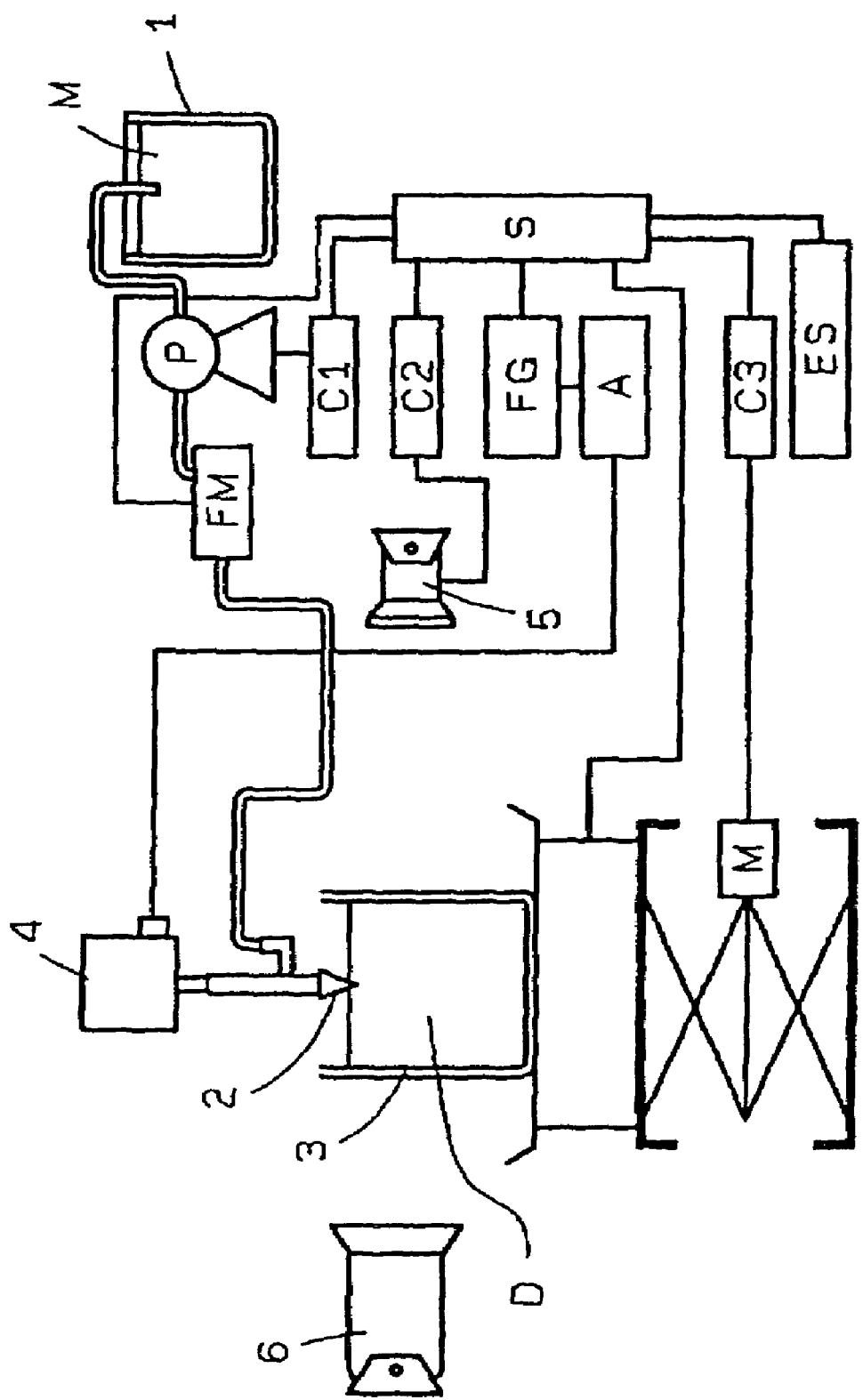
FIG. 4 is a conceptual diagram showing a production apparatus for resin fine particles used in Example 2.

A production apparatus for resin fine particles as shown in FIG. 4 was produced.

According to the apparatus shown in FIG. 4, measuring unit S for size of the liquid droplets was provided on the right side of dispersion container 3. An image photographed by photography unit 5 was sent to the measuring unit S via image controller C2 so as to measure size of the formed liquid droplets. The result of the calculation process of the measurement value was fed back to pump controller C1 or function generator (electrical signal generator) FG, so that adjustment is made for homogenizing the liquid droplet size by an automatic operation.

Next, resin fine particles were produced using the apparatus.

In the same manner as in Example 1 except that the apparatus shown in FIG. 4 was used and liquid polymerizable monomer M was prepared using tetramethylol methane tetra acrylate in place of the trimethylol propane trimethacrylate, resin fine particles were produced.

The average particle size of the obtained resin fine particles was 599 μm, with 89% of the resin fine particles included in a range of ±10% of the average particle size.

EXAMPLE 3

In the same manner as in Example 1 except that the apparatus shown in FIG. 4 was used, resin fine particles were produced. That is, liquid droplets were produced by shaking liquid dispersion medium D with liquid polymerizable monomer M discharged. Size of the produced liquid droplets were measured by measuring unit S, and the result of the calculation process of the measured value was fed back to pump controller C1, so that adjustment was made for homogenizing size of the liquid droplets by the automatic operation. By heating and agitating with an agitator and a cooling pipe installed in dispersion container 3 after jetting a predetermined amount of monomer M, monomer M was polymerized so as to obtain resin fine particles.

The average particle size of the obtained resin fine particles was 601 μm, with 95% of the resin fine particles included in a range of ±10% of the average particle size.

COMPARATIVE EXAMPLE 1

In the same manner as in Example 1 except that the CCD camera and the CRT monitor were not used, and the discharging condition and the frequency condition were not adjusted, resin fine particles were obtained.

The average particle size of the obtained resin fine particles was 688 μm, with only 78% of the resin fine particles included in a range of ±10% of the average particle size.

COMPARATIVE EXAMPLE 2

A resin fine particle production apparatus same as the apparatus used in Example 1 except that three jetting openings 2 each having a 0.3 mm inner diameter were opened side by side in liquid dispersion medium D, was produced.

Using the apparatus, liquid droplets were produced in the same manner as in Example 1 except that liquid polymerizable monomer M was jetted from three jetting openings 2 by a 15.9 mL/minute rate. An image photographed by photography unit 5 and enlarged and displayed on CRT display 7 had the liquid droplets superimposed, so that they were not individually recognized visually.

The average particle size of the resin fine particles obtained by polymerizing monomer M without adjustment for homogenizing size of the liquid droplets by a manual operation was 610 μm, with only 65% of the resin fine particles included in a range of ±10% of the average particle size.

INDUSTRIAL APPLICABILITY

According to the present invention, it is possible to provide a method for preparing resin fine particles of a homogeneous particle size used in the fields of chemistry, medicine, electronic material or the like, resin fine particles and a production apparatus for resin fine particles.

The invention claimed is:

1. A method for preparing a resin fine particle, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising recognizing a moment of a liquid droplet formation from a liquid column of said polymerizable monomer with a camera capable of photographing by a high shutter speed sufficient for catching the high speed liquid droplet formation state by a stationary state, or with combining the camera and a stroboscopic illumination, and a condition of said discharging and/or said mechanical vibration of the liquid being determined by feedback from a result of the recognition.

2. A method for preparing a resin fine particle, which comprises discharging a liquid comprising a polymerizable monomer as a dispersion phase into a continuous phase; splitting the liquid comprising the polymerizable monomer by applying mechanical vibration to form a liquid droplet; and polymerizing the liquid droplet in a state without splitting or integrating the liquid droplet, said method comprising measuring size of said formed liquid droplet with a method of taking in the image of the liquid droplets formed in the dispersion phase in a computer for measurement, and a condition of said discharging and/or said mechanical vibration of the liquid being determined by feedback from a result of the measurement, wherein the feedback can be controlled by sending a control signal from the computer or via a sequencer to the unit for applying the mechanical vibration or the unit for adjusting the discharge of the polymerizable monomer.

3. An apparatus, which is for carrying out the method for preparing a resin fine particle according to claim 2, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a photography unit for photographing a formed liquid droplet, wherein the photography unit is a CCD camera comprising a high speed shutter sufficient for catching the high speed liquid droplet formation in a stationary state, and a display capable of enlarging and displaying the minute liquid droplets in a visibly recognizable size.

4. An apparatus, which is for carrying out the method for preparing a resin fine particle according to claim 2, which comprises a dispersion container; a jetting opening, opened in the dispersion container, for discharging a liquid comprising a polymerizable monomer into a liquid dispersion medium; a means for applying mechanical vibration to the liquid comprising the polymerizable monomer jetted into the liquid dispersion medium; and a measuring means for measuring size of a formed liquid droplet, wherein the measuring means for size of the liquid droplets is to take in the image obtained by photographing the state of the liquid droplet formation by the photography unit into a computer, and measure size of the liquid droplets by an image processing unit, wherein the photography unit is a CCD camera comprising a high speed shutter or a stroboscopic illumination sufficient for catching the high speed liquid droplet formation in a stationary state, and a display capable of enlarging and displaying the minute liquid droplets in a visibly recognizable size.

5. An apparatus, which is for carrying out the method for preparing a resin fine particle according to claim 2, which comprises a dispersion container; a jetting opening, opened in the dispersion container, for discharging a liquid comprising a polymerizable monomer into liquid dispersion medium; a means for applying mechanical vibration to the liquid comprising the polymerizable monomer jetted into the liquid dispersion medium; a measuring means for measuring size of a formed liquid droplet, wherein the measuring means for size of the liquid droplets is to take in the image obtained by photographing the state of the liquid droplet formation by photography unit into a computer, and measure size of the liquid droplets by an image processing unit, wherein the photography unit is a CCD camera comprising a high speed shutter or stroboscopic illumination sufficient for catching the high speed liquid droplet formation in a stationary state, and a display capable of enlarging and displaying the minute liquid droplets in a visibly recognizable size and, a means for adjusting a discharging condition and/or a mechanical vibration condition of a liquid comprising a polymerizable monomer based on a measurement result of size of a liquid droplet by sending a control signal from the computer or via a sequencer to the unit for applying the mechanical vibration or the unit for adjusting the discharge of the polymerizable monomer.

* * * * *